United States Patent [19]

Cripe

[11] Patent Number: 5,293,709

[45] Date of Patent: Mar. 15, 1994

[54] PHOTOGRAPHIC DECOYS

[76] Inventor: James A. Cripe, E. 1503 Riverview Dr., Colbert, Wash. 99005

[21] Appl. No.: 889,819

[22] Filed: May 29, 1992

[51] Int. Cl.$^5$ ............................................. A01M 31/06
[52] U.S. Cl. ............................................................ 43/3
[58] Field of Search ............................................. 43/2, 3

[56] References Cited

U.S. PATENT DOCUMENTS

| 282,851 | 8/1883 | Danz | 43/3 |
|---|---|---|---|
| 364,573 | 6/1887 | Brinkop | 43/3 |
| 2,011,480 | 8/1935 | Gazalski | 43/3 |
| 2,746,196 | 5/1956 | Kan | 43/3 |
| 3,707,798 | 1/1973 | Tryon | 43/3 |

FOREIGN PATENT DOCUMENTS 478235  11/1951  Canada ................................... 43/3

OTHER PUBLICATIONS

Herter's Catalog, publication date unknown.
Photograph, "WF 602 Ice Stand".

*Primary Examiner*—Kurt C. Rowan
*Attorney, Agent, or Firm*—Wells, St. John, Roberts, Gregory & Matkin

[57] ABSTRACT

A decoy is described using a photographic decoy image on at least one surface of a relatively flat decoy body. The photographic image includes a low glare coating to minimize reflection. The body is preferably formed of a weatherproof plastic material. The preferred material is polyethylene and an alternate material is ABS plastic. Either the preferred or alternate material may be co-extruded with a darkened core layer of recycled, re-ground material and light colored surface areas of virgin material. The surfaces are treated, preferably by a corona discharge treating system, to produce a printable surface area. A four color printing process is used to transfer the photographic images of the animals onto the treated surface. Ultraviolet inks are used for this purpose. A fifth coat of transparent ultraviolet ink mixed with fine silica is used to produce an extremely low reflective surface on the image. A stake is fitted through appropriate stake receiving apertures for upright forms of the present decoy body. The stake includes a notch and detent for releasably securing the decoy to the stake.

26 Claims, 4 Drawing Sheets

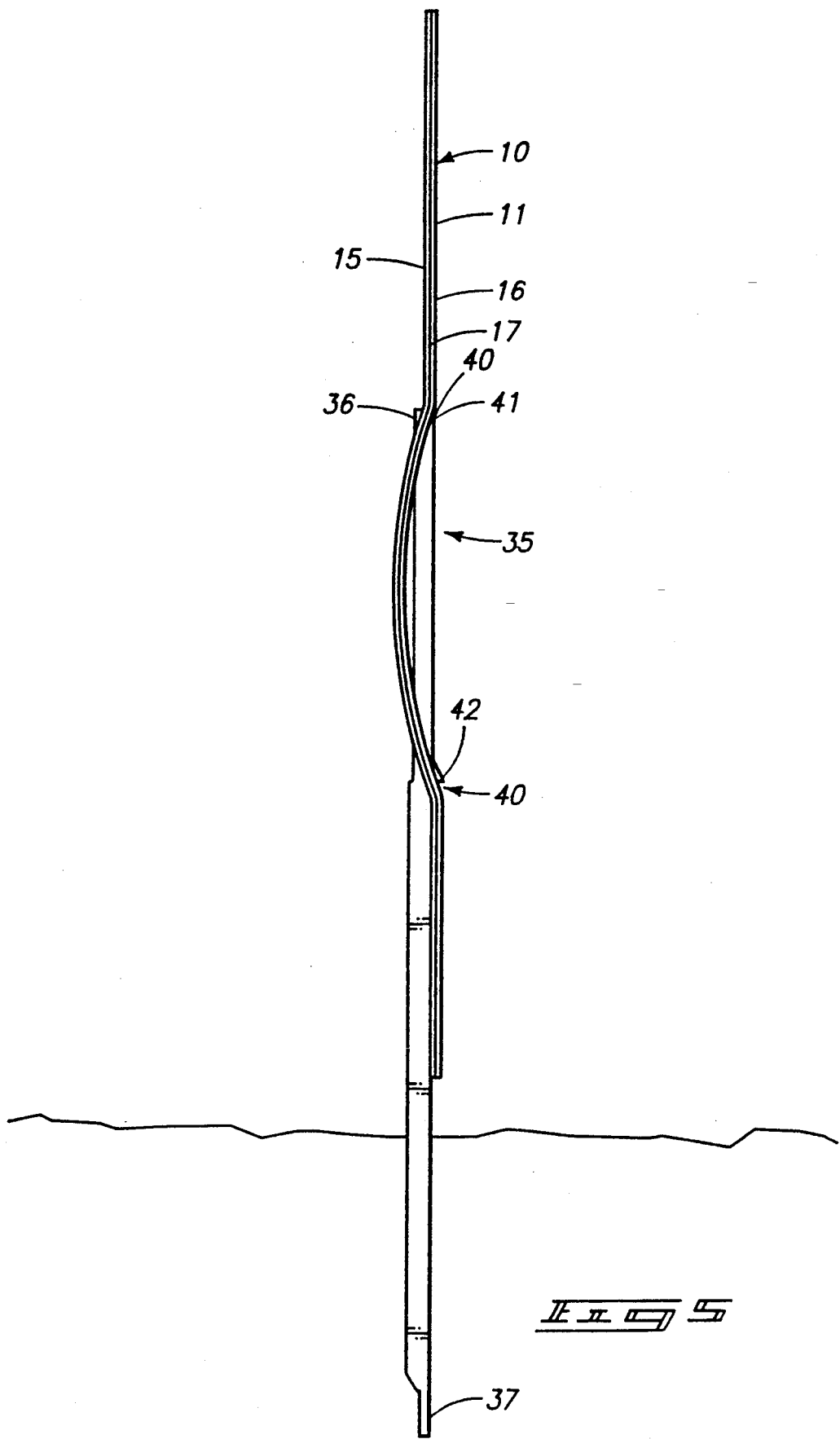

PHOTOGRAPHIC DECOYS

TECHNICAL FIELD

The present invention relates to decoys and more in particular, two-dimensional or "silhouette" decoys.

BACKGROUND OF THE INVENTION

Animal decoys have been used for centuries for attracting various animals into the range of hunting instruments. The most recognized form of decoy is the duck or goose decoy formed in three dimensions and painted to closely resemble the selected animal. However, decoys have been used for many different animals through the years, and have also been developed in two dimensions as silhouettes.

The advantage of substantially two-dimensional silhouette decoys is that a great number can be easily carried to a particular site and placed about in a quick and efficient manner. They are also easy to store and transport.

A disadvantage of prior two-dimensional silhouettes is that the typical coating on the board surfaces does not accurately represent the animal to be decoyed. This is due to the overall difficulty presented in producing an exact likeness of the animal, including colors.

Another difficulty is that the usual screening process is economical only in a limited number of colors so both the visual image and its color are not technically accurate.

A still further difficulty with the prior two-dimensional decoy arrangements is reflectivity of the surfaces. Surface reflection has long been recognized as a drawback, especially with the large flat surfaces presented on two-dimensional decoys. Reflection is easily detected by animals and thus gives sufficient cause for the animal to move on to a different area. Reflectivity therefore detracts from the intent of the decoy to attract animals.

Another difficulty with prior two-dimensional decoys is cost. Original artwork is costly and subsequent screening processes are also expensive.

The above problems are recognized to a limited degree in U.S. Pat. No. 4,845,872 granted in 1989 to Anderson. This patent discloses a water fowl decoy constructed of sheet material and having a painted coating thereon. The sheet body is provided with a roughened surface texture and may be painted or printed with a flat, low-glare paint to reduce reflectivity.

From the above, it can be seen that while two-dimensional decoys represent certain desirable characteristics, it has remained a problem to provide such decoys with low reflectivity along the relatively flat surfaces of the decoy bodies, while accurately representing the likeness of the animal on the decoy surface.

The present invention, therefore, has for an object, to provide a decoy or an animal decoy having a close likeness of an animal thereon.

A further object is to provide such a decoy with an extremely low surface reflectivity to avoid alerting the decoyed animal.

A still further object is to provide such a decoy that includes a stake support arrangement that will securely mount the decoy against unintentional removal. These and still further objects and advantages will become apparent upon reading the following description which, taken with the accompanying drawings, disclose a preferred form of the present invention.

BRIEF DESCRIPTION OF THE DRAWINGS

A preferred form of the present invention is diagrammatically illustrated in to the accompanying drawings in which:

FIG. 5 is a side elevation of the present decoy and stake assembled.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
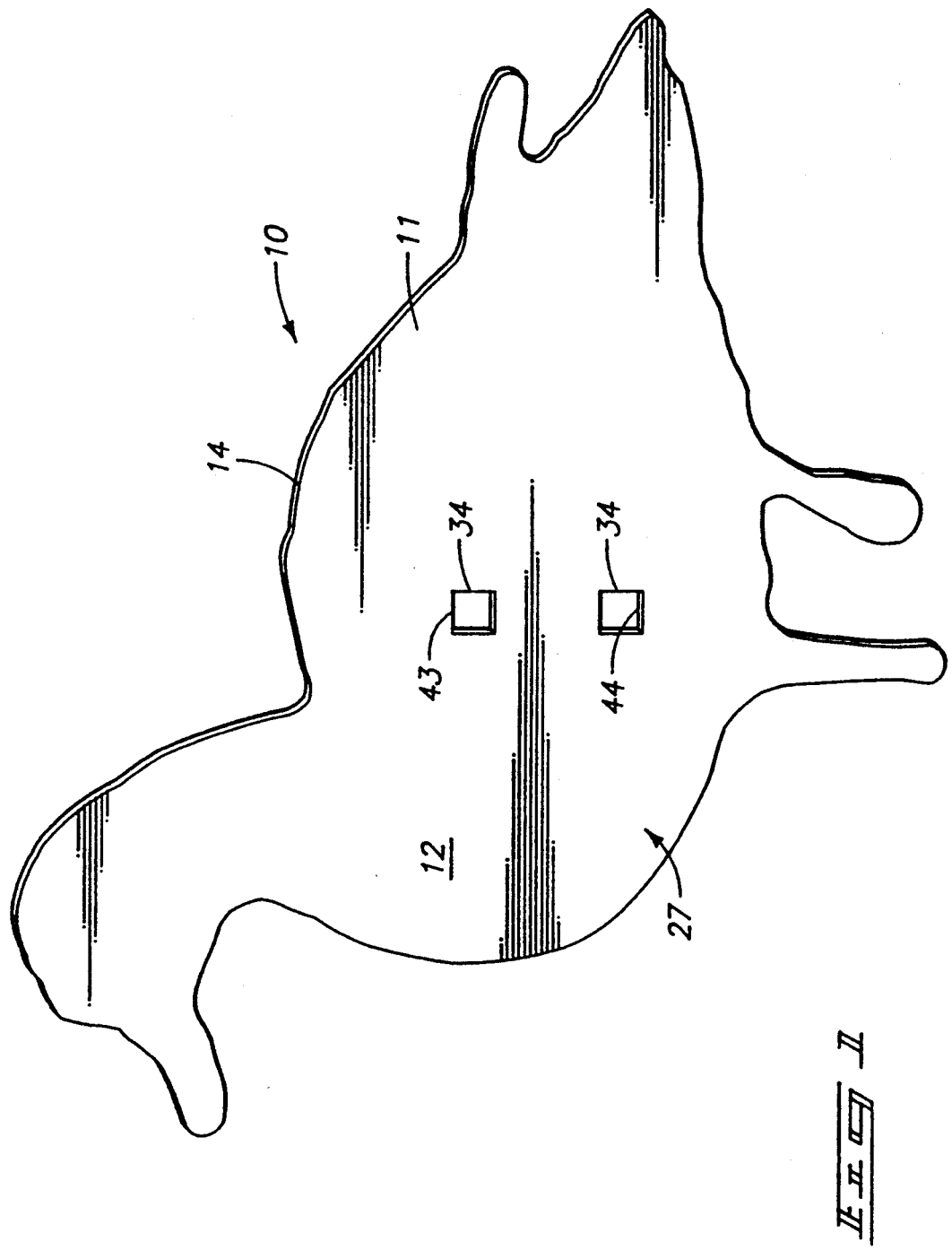
FIG. 1 is a front elevation view of a decoy incorporating features of the present invention and shown in the silhouette form exemplifying a duck.

Referring now in greater detail to the drawings, a decoy is generally indicated in FIG. 1 of the drawings by the reference numeral 10. The decoy 10 is shown as a duck silhouette. However, it should be understood that the silhouette configuration may take any other animal shape desired. For example, geese, turkey, deer, fox, coyote, and others may be as easily produced as the present decoy 10. Additionally, it should be understood that the silhouette illustrated does not restrict the present decoy to an upright profile configuration. The present decoy may be produced in top plan views as seen from above, or at any desired angle. The decoy body may also be produced in joinable sections for assembly in the field.

The decoy will include a 4 color printed photographic image 12 (FIG. 1) on at least one surface thereof. The photographic image is diagrammatically represented in the drawings and is included within the peripheral silhouette outline 14 of the decoy body 11. The outline of the decoy is coincident with the perimeter of the animal photograph. The shape is cut from a blank sheet, preferably by a die cutter, or other appropriate cutting device.

Figure 2:
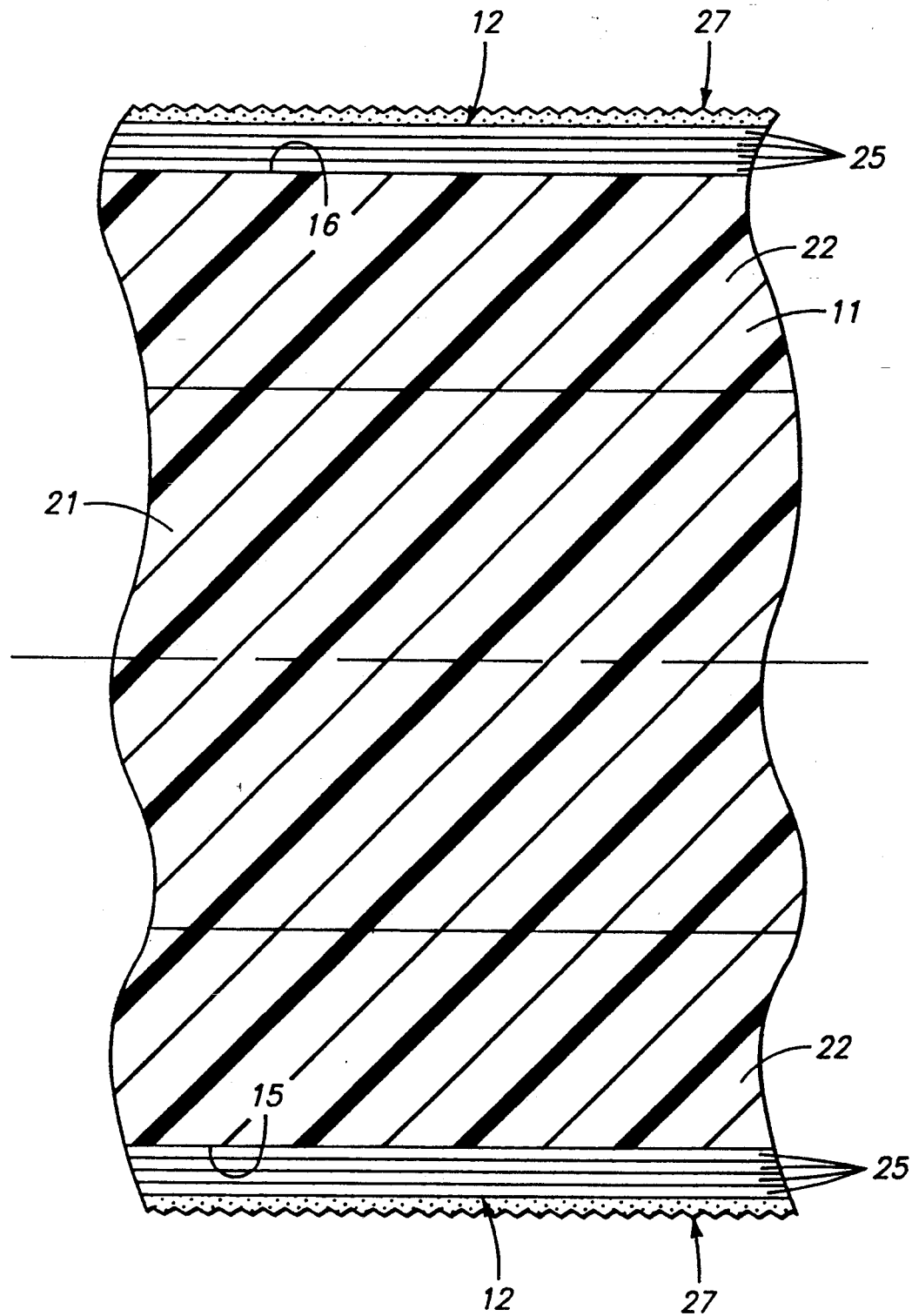
FIG. 2 is an enlarged fragmented section through the thickness dimension of the first preferred decoy.

The photographic image 12 is preferably printed by conventional printing processes on one surface 15, but may be printed on both opposed surfaces 15, 16 (FIG. 2) of the decoy body 11.

The thickness dimension of the body 11 is observable at the edge 17. The overall thickness dimension is advantageously approximately 0.075 inches.

The preferred decoy body 11 is formed from a sheet of weatherproof material, preferably plastic. In the most preferred form, the plastic is polyethylene, specifically extrudable high density polyethylene having an ASTM nominal density of approximately 0.957. ABS plastic has also been used with reasonably successful results.

In a preferred form, the plastic material (polyethylene or alternatively ABS) is co-extruded in three layers. Preferably, the co-extruded material includes a first core layer 21 (FIG. 2) of recycled or reground plastic material, along with outer second layers 22 of virgin material. The thickness dimension of the first core layer 21 is advantageously approximately 0.045 inches. The thickness of each second layer 22 is approximately 0.015 inches. This is done for economics, and to permit a three color preferred configuration of the body. The first or core layer 21 is advantageously dark colored or black, while the outer or second layers 22 are substantially white or light colored. The core layer 21 has a thickness dimension greater than the outer layers, thus presenting a larger area of darkened color along the edge 17 to avoid alerting animals.

The body outer or second layers 22, are treated to accept printing inks. In a preferred form, the surfaces are subjected to an electrical charge, formed across the surfaces to create an oxidized surface on the plastic. This treatment is referred to in the plastics and printing industries as a "corona" discharge process. The treatment is performed at a "Dyne" level of at least 40. In the preferred form, the Dyne level is approximately 70. Such surface treatment prepares the second or outer layers 22 for printing processes.

An alternate surface treatment is "flame" treatment which may also produce an acceptable printing surface on the body. Other surface treatments may also be used. However, the corona treatment using high voltage surface charge across the material, produces the most desirable effect for printing the photographic image on the present decoy body.

Photographic printing onto the decoy body is produced by common four color printing processes from actual photographs of the desired animal. The printing process is completed using ultraviolet (UV) inks in four layers as diagrammatically shown in FIG. 2. Pigments in half tone colors are specifically selected to match Standard Web Offset Printing (SWOP) specifications. The ultraviolet inks are preferred due to their low reflectivity (approximately 16% at 60 degrees) and the durability of such ink in outdoor environments, as well as preferred quick drying properties. A preferred ink is "Sericol" TM brand, type CD used in a four color half tone printing process.

A difficulty experienced with ultraviolet ink, however, is that it will not remain soft in cold weather. It was found though that the UV ink when, used on a polyethylene base sheet, will not crack at low temperatures. The ink, adhered to the polyethylene sheet, will flex with the sheet, even in low temperatures. This is an advantage over the alternative ABS plastics, which, while serviceable for decoys in average weather conditions, is not preferred for colder weather application since the material will tend to crack on flexure at low temperatures and will thus crack the UV inks.

The present decoy 10 is provided with color printed photographic images having extremely low surface reflection. This is accomplished by means of a low glare surface or coating on the four color UV ink layers 25. The low glare surface is preferably produced by texturing means 27 applied on the image. The preferred texturing means 27 is comprised of a transparent UV ink (without pigment) printed on top of the first four colored layers 25. A preferred brand is "Sericol" TM type special CD clear ink, with amorphous transparent fumed silica particles to dramatically reduce reflection. This ink is applied as a fifth surface over the colored UV inks. When dry, the ink surface has millions of silica particles and lumps in it. To the human eye and touch, it is smooth. However, when viewed with a microscope, the clear ink has a very rough surface which has the appearance of abrasive paper. This rough surface creates an ultra flat, no shine surface.

For ABS sheet material bodies, UV ink is also used. A particularly useful brand is "Sericol" TM type NPC ink with a clear version of the same brand mixed with silica particles used as the no-glare fifth printing layer.

It is preferred that the texturing means have the capability of reducing reflectivity of the photographic images to a maximum of 5% at an angle of 60 degrees. By using fumed silicon particles having a mean size of approximately ten microns, a preferred reflectivity of approximately 2% to 4% at 60° is achieved. It has been found that reflectivity in this range is not detectable by animals. It is also pointed out that the degree of reflectivity using the present decoy construction is substantially below that available with low reflective or "mat" ultraviolet inks (which demonstrated an approximate 16% reflectivity at 60 degrees).

With an actual photograph of an animal on the present decoy 10, significantly improved results may be obtained since the animals will much more likely recognize the decoy as an actual animal as opposed to a mere likeness of the animal. The photographic process and four color printing enables transmission of an image of the decoy animal that is true to the actual image of the animal, and its coloration, sufficiently so that the decoy, when placed next to an actual animal, can be photographed and the untrained viewer will not be able to visually detect the difference between the actual animal and the decoy.

The photographic images are made particularly useful by the nature of the present surface treatment on the decoy to reduce reflection. The UV inks used in the four color printing process accomplish part of this result, but reflectivity is lowered even further by the fifth coating of clear UV ink mixed with the silica particles. The obtained low reflectivity (approximately 2% to 4%) assures that the decoys will not alert animals by reflecting sunlight.

Figures 3, 4:
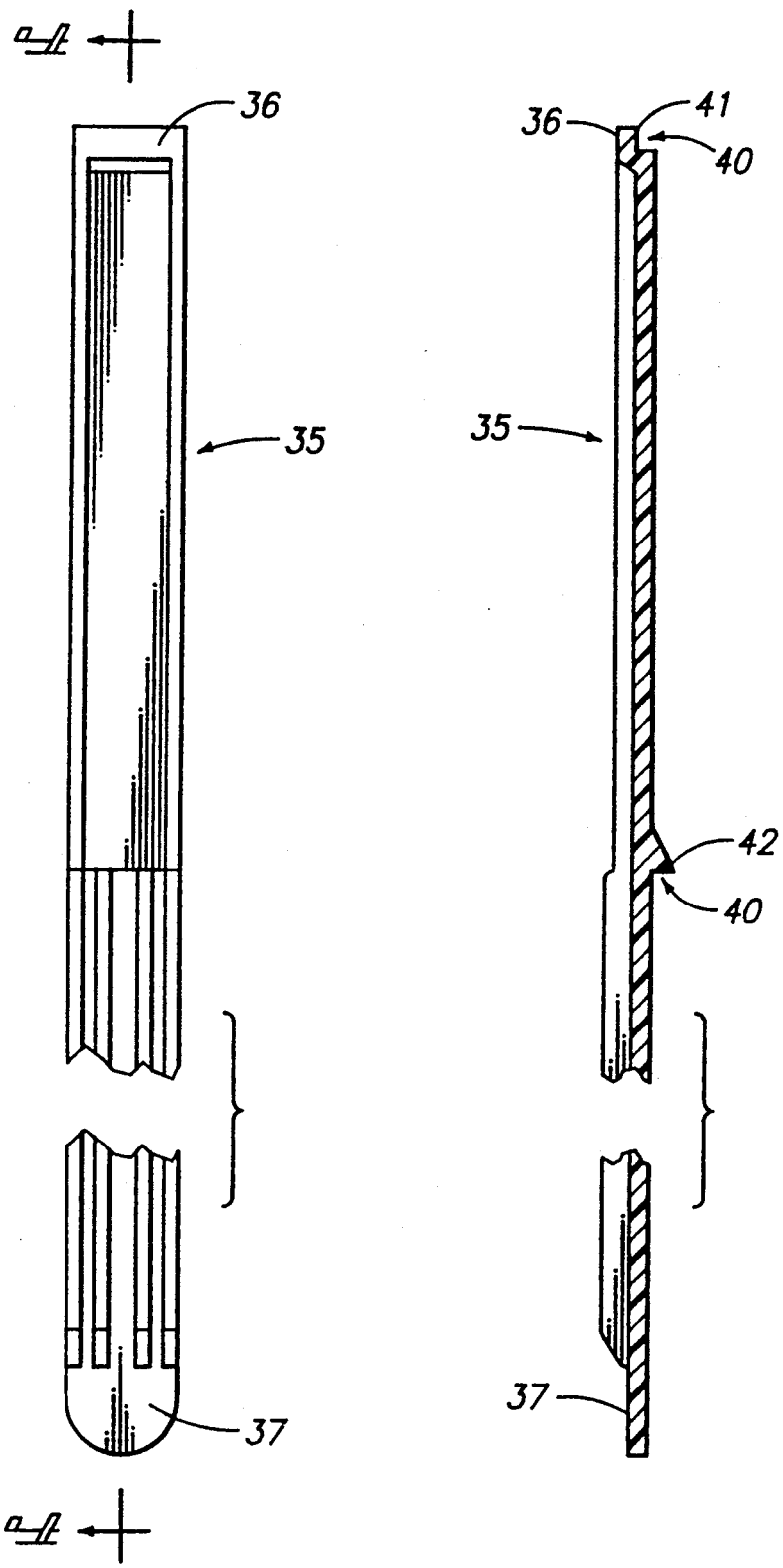
FIG. 3 is a fragmented front elevation view of the present stake.
FIG. 4 is a sectional view taken on line 4—4 in FIG. 3.

The decoy bodies that are intended for upright usage will include stake apertures 34 that are spaced apart to receive a support stake 35 (FIGS. 3–5). The stake 35 is received through the apertures 34 substantially as shown by FIG. 5. In this configuration, the stake serves to reinforce the decoy body, lending it rigidity against undesirable movement when placed in a field.

The stake 35 is preferably formed of injection molded plastic. Glass impregnated nylon and glass impregnated polycarbonate have been found to be useful materials for their strength and durability. The stake is elongated and has a cross sectional configuration adapted to be received through the stake apertures 34. In a preferred form, the stake is approximately eighteen inches long and measures approximately 0.75 by 0.25 in cross section.

The stake extends between a top end 36 and a bottom end 37. The bottom end 37 is rounded to provide a blunted point for insertion into the ground. The rounded point provides a safety feature in view of the typical stake which has a sharp point end. The stakes are typically carried along with the decoys a considerable distance from a vehicle to a hunting area. Terrain is often rough and tripping is a fair likelihood. Therefore, the rounded stake ends provide for a substantial improvement in safety.

The support stake 35 includes a retaining means 40 thereon for releasably securing the decoy to the stake. The retaining means 40, in the preferred from, include a notch 41 in the top stake end 36, and a detent 42 spaced toward the bottom end 37 from the notch 41. The notch 41 receives an edge surface 43 of the top stake aperture, while an edge 44 of the bottom aperture is received by the detent 42. The notch and detent secure the decoy body 11 against unintentional removal. Thus, when it is desired to remove the decoy by pulling the stake upwardly from the ground, the user may simply pull upwardly on the decoy. The upward pulling motion will be transmitted directly to the stake through the retaining means 40.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An animal decoy, comprising:
   a body having opposed surfaces;
   a photographic decoy image on at least one surface of the body; and
   said photographic decoy image including a low glare coating comprised of a printed coating of non pigmented ultraviolet ink with texturing means for reducing glare of the photographic image.

2. The animal decoy as claimed by claim 1 wherein the texturing means includes amorphous transparent silica particles to produce texture in the coating and reduce glare from the photographic image.

3. The animal decoy as claimed by claim 1 wherein the texturing means includes amorphous transparent silica particles to produce texture in the coating and reduce reflectivity from the photographic image to a maximum of approximately 5% at an angle of 60 degrees.

4. The animal decoy as claimed by claim 1 wherein the body is formed of a weatherproof sheet material having substantially flat opposed surfaces.

5. The animal decoy as claimed by claim 1 wherein the body is formed of a weatherproof sheet material having substantially flat opposed surfaces; and wherein both surfaces include the photographic image printed thereon.

6. The animal decoy as claimed by claim 1 wherein the body is formed of polyethylene sheet material having substantially flat opposed surfaces treated to accept printing ink.

7. The animal decoy as claimed by claim 1 wherein the body is formed of polyethylene sheet material having substantially flat opposed surfaces treated by an electrical corona discharge process at a minimum Dyne level of 40 to accept printing ink.

8. The animal decoy as claimed by claim 1 wherein the body is formed of polyethylene sheet material having substantially flat opposed surfaces corona treated by an electrical corona discharge process at a Dyne level of 70 to accept printing ink.

9. The animal decoy as claimed by claim 1 wherein the body is formed of ABS plastic sheet material having substantially flat opposed surfaces.

10. The animal decoy as claimed by claim 1 wherein the body is formed of polyethylene sheet material having substantially flat opposed surfaces treated to accept printing ink; and wherein both surfaces include the photographic image printed thereon.

11. The animal decoy as claimed by claim 1 wherein the body is formed of co-extruded polyethylene sheet material having a core layer of a first polyethylene material and opposed substantially flat opposed outer layers of a second polyethylene material.

12. The animal decoy as claimed by claim 1 wherein the body is formed of co-extruded polyethylene sheet material having a core layer of a first polyethylene material of dark coloration and opposed substantially flat opposed outer layers of a second polyethylene material having a substantially white printing surface.

13. The animal decoy as claimed by claim 1 wherein the body is formed of co-extruded polyethylene sheet material having a core layer of a recycled first polyethylene material of dark coloration and opposed substantially flat outer layers of a virgin second polyethylene material having a substantially white colored printing surface.

14. The animal decoy as claimed by claim 1 wherein the body is formed of co-extruded polyethylene sheet material having a core layer of a recycled first polyethylene material and opposed substantially flat opposed outer layers of a virgin second polyethylene material.

15. The animal decoy as claimed by claim 1 wherein the body is formed as a sheet of co-extruded plastic having an overall thickness dimension, and having a core layer and opposed substantially flat outer layers, the core layer having a thickness dimension greater than the outer layers.

16. The animal decoy as claimed by claim 1 wherein the photographic image is printed by a four color process using ultraviolet inks.

17. The animal decoy as claimed by claim 1 wherein the texturing means includes amorphous transparent silica particles of approximately 10 microns in size to create a microscopic coarse texture for reducing glare from the ultraviolet inks.

18. The animal decoy as claimed by claim 1 wherein the body is formed of a weatherproof sheet material having substantially flat opposed surfaces and includes stake receiving apertures formed therein;
   an elongated stake releasably receivable through the stake receiving apertures; and
   retaining means on the stake for releasably engaging and holding the body against longitudinal movement relative to the stake.

19. An animal decoy, comprising:
   a substantially flat plastic body having opposed surfaces;
   a photograph of an animal printed directly on at least one of said opposed surfaces on the body; and
   a low glare coating comprised of transparent microscopic particulate materials printed on the photograph.

20. The animal decoy as claimed by claim 19 wherein the body is formed of polyethylene sheet material with surface treatment by an electrical corona discharge process at a Dyne level of at least 40.

21. The animal decoy as claimed by claim 19 wherein the body is formed of ABS plastic sheet material.

22. An animal decoy, comprising
   a body formed of plastic sheet in the shape of an animal silhouette;
   said body having at least one surface for directly receiving pigmented printing inks;
   a four color photograph of an animal printed directly on the one surface with pigmented printing inks; and
   a low glare coating printed on the photograph.

23. An animal decoy, comprising a polyethylene body formed in the shape of an animal silhouette and having a surface thereon treated by an electrical corona discharge process at a Dyne level of at least 40;

a photographic image printed on the surface with ultraviolet inks; and a low glare coating on the photographic image producing a reflectance at a maximum level of approximately 5% at an angle of 60 degrees.

24. An animal decoy, comprising:

a body formed of co-extruded polyethylene sheet material with a core layer of recycled polyethylene material having a dark coloration and outer layers of virgin polyethylene material having a light coloration;

wherein at least one of the outer layers is treated by an electrical corona discharge process at a Dyne level of at least 40;

said body being formed in the shape of an animal silhouette;

a photographic image printed with a four color printing process on the treated outer layer with ultraviolet inks; and a transparent low glare ultraviolet ink coating on the photographic image with amorphous silica particles for producing a reflectance at a maximum level of 5% at an angle of 60 degrees from the treated outer layer.

25. A stake support for an animal decoy formed with a substantially flat body having opposed surfaces and including upper and lower stake receiving apertures formed therein;

an elongated stake extending between a top end and a bottom end and releasably receivable through the upper and lower stake receiving apertures; and retaining means on the stake for releasably engaging the body adjacent the upper and lower stake receiving apertures, to hold the body against longitudinal movement relative to the stake; and wherein the retaining means includes a notch formed in the stake adjacent the top end of the stake for engaging the body adjacent the upper stake receiving aperture to prevent downward movement of the body relative to the stake and a detent integral with the stake and spaced downwardly toward the bottom end of the stake from the notch, with a downwardly facing surface for engaging the body to prevent upward movement of the body relative to the stake.

26. An animal decoy, comprising a body formed of plastic sheet formed in the shape of an animal silhouette;

said body having at least one surface for directly receiving pigmented printing inks;

a four color photographic image of an animal printed directly on the one surface with pigmented printing inks; and a low glare coating on the photographic image comprised of a printed coating of transparent ink including particles to produce texture in the coating and reduce reflectivity from the photographic image.

* * * * *